US012680035B2

(12) United States Patent     (10) Patent No.:   US 12,680,035 B2

Canós et al.     (45) Date of Patent:   *Jul. 14, 2026

(54) METHODS AND SYSTEMS FOR THE CONVERSION OF CRUDE OIL TO PETROCHEMICAL PRODUCTS

(71) Applicants: Universitat Politècnica De València, Valencia (ES); Saudi Arabian Oil Company, Dhahran (SA); Consejo Superior De Investigaciones Cientificas, Madrid (ES)

(72) Inventors: Avelino Corma Canós, Valencia (ES); Laurent Louis André Sauvanaud, Ribarroja (ES); Saad Al-Bogami, Dammam (SA); Yannick Sylvain Mathieu, Valencia (ES); Ferran Torres Martí, Monocofa (ES)

(73) Assignees: Universitat Politécnica De València, Valencia (ES); Saudi Arabian Oil Company, Dhahran (SA); Consejo Superior De Investigaciones Cientificas, Madrid (ES)

( * ) Notice: Subject to any disclaimer, the term of this patent is extended or adjusted under 35 U.S.C. 154(b) by 97 days.

This patent is subject to a terminal disclaimer.

(21) Appl. No.: 18/430,106

(22) Filed: Feb. 1, 2024

(65) Prior Publication Data

US 2024/0336856 A1     Oct. 10, 2024

Related U.S. Application Data

(63) Continuation of application No. PCT/ES2023/070225, filed on Apr. 5, 2023.

(51) Int. Cl.
    *C10G 55/06*        (2006.01)
    *B01D 3/00*        (2006.01)

(52) U.S. Cl.
    CPC ............. *C10G 55/06* (2013.01); *B01D 3/009* (2013.01); *C10G 2400/20* (2013.01); *C10G 2400/30* (2013.01)

(58) Field of Classification Search
    CPC ................ C10G 55/06; C10G 2400/20; C10G 2400/30; C10G 7/00; C10G 11/20; B01D 3/009
    See application file for complete search history.

(56) References Cited

U.S. PATENT DOCUMENTS

| | | | |
|---|---|---|---|
| 2,853,439 A | 9/1958 | Ernst, Jr. | |
| 4,311,580 A | 1/1982 | Bartholic | |

(Continued)

OTHER PUBLICATIONS

International Search Report and Written Opinion Mailed Oct. 17, 2023 in related International Application No. PCT/ES2023/070225 filed Apr. 5, 2023, 11 pages.

*Primary Examiner* — Michelle Stein

(74) *Attorney, Agent, or Firm* — Dinsmore & Shohl, LLP

(57) ABSTRACT

Methods for processing a crude oil feedstock include introducing a crude oil stream to a reactive distillation unit to remove conradson carbon and metals from the crude oil stream and generate a distillate stream having a mean boiling point distribution less than the crude oil stream and passing the distillate stream in a gaseous form in a continuous manner and without further processing to a catalytic cracking reactor operating at a temperature of 300° C. to 800° C. with a cracking catalyst disposed therein that cracks the distillate stream to form a petrochemical product stream including light olefins and BTX.

19 Claims, 6 Drawing Sheets

(56)  References Cited

U.S. PATENT DOCUMENTS

| 7,578,929 | B2 | | 8/2009 | Stell et al. | |
|---|---|---|---|---|---|
| 10,301,556 | B2 | | 5/2019 | Al-Ghamdi et al. | |
| 10,851,316 | B2 | | 12/2020 | Abudawoud et al. | |
| 2005/0010075 | A1 | * | 1/2005 | Powers | C07C 4/04 |
| | | | | | 585/648 |
| 2021/0284921 | A1 | * | 9/2021 | Marri | B01J 8/26 |

* cited by examiner

METHODS AND SYSTEMS FOR THE CONVERSION OF CRUDE OIL TO PETROCHEMICAL PRODUCTS

CROSS-REFERENCE TO RELATED APPLICATIONS

Field

This application claims priority to application number PCT/ES2023/070225 filed Apr. 5, 2023, which is incorporated by reference herein in its entirety.

BACKGROUND

Field

The present disclosure relates to the production of petrochemical products and, more particularly, to methods and associated systems for the direct production of petrochemical products from crude oil.

Technical Background

Crude oil refineries are generally oriented to the production of transportation fuels such as gasoline, diesel and kerosene, with a minor but economically important side production of building blocks for petrochemical industry, mainly ethylene, propylene, butenes, butadiene, and aromatic compounds such as benzene, toluene, and xylene. These are the most common petrochemical feedstocks and their markets are expanding faster than that of fuels. They are mainly produced from steam cracking of petroleum gas or light distillate, with a fraction from refinery processes such as FCC for propylene and reforming for aromatics. Availability of these chemicals is thus dependent on the refining business. Therefore, it may be desirable from the point of view of the chemical market to produce such building blocks for the petrochemical industry directly from a universally available feedstock. Crude oil makes an ideal candidate, being cheaply available everywhere and compatible with a chemical business.

Previous attempts to directly convert crude oil in a steam cracker have been limited by coil coking and a limited product flexibility. A number of processing schemes have been proposed in recent years that take a traditional refinery as a basis, and then optimize the conversion of a heavy fraction (VGO and residue) into light distillates by a combination of catalytic cracking, hydrocracking, fluid coking and delayed coking. The light distillates and paraffinic gases from either direct distillation or bottoms conversion are then converted in a multi-feed from ethane to light gasoil steam cracker coupled with an aromatic complex, similar to those found in traditional petrochemical hubs. These complexes rely on mature technologies, but involve a very large number of units. In order to reduce this complexity and associated costs improved schemes were proposed where the crude is simply split into two fractions, with the light one sent to steam cracking and the heavier fraction converted in a single unit, preferably fluid catalytic cracking or hydrocracking. Such processes included a main conversion step of light distillates into chemicals which relies on the steam cracking process, which is very energy intensive and has limited product selectivity.

BRIEF SUMMARY

Accordingly, in view of the ever growing demand of these intermediary petrochemical products, such as light olefins, there is a need for processes to produce these intermediate compounds from other types of feedstocks that are available in large quantities at relatively low cost. The present disclosure is related to processes and systems for producing these intermediate compounds, sometimes referred to in this disclosure as "system products," by the direct conversion of crude oil as the feedstock.

According to one or more embodiments, a crude oil feedstock may be processed by a method which comprises introducing a crude oil stream to a reactive distillation unit to remove conradson carbon and metals from the crude oil stream and generate a distillate stream having a mean boiling point distribution less than the crude oil stream, a light gas stream consisting of C1-C4 hydrocarbons, a heavy liquid fraction comprising atmospheric residue formed from hydrocarbons having a boiling point of 400° C. or greater, and coke; and passing the distillate stream in a gaseous form in a continuous manner and without further processing to a catalytic cracking reactor with a cracking catalyst disposed therein that cracks the distillate stream to form a petrochemical product stream comprising light olefins and BTX, a light gas effluent consisting of hydrogen and C1-C4 alkanes, and an unconverted distillate stream comprising the remainder of the distillate stream passed to the catalytic cracking reactor unit, wherein the catalytic cracking reactor operates at a temperature of 300° C. to 800° C.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
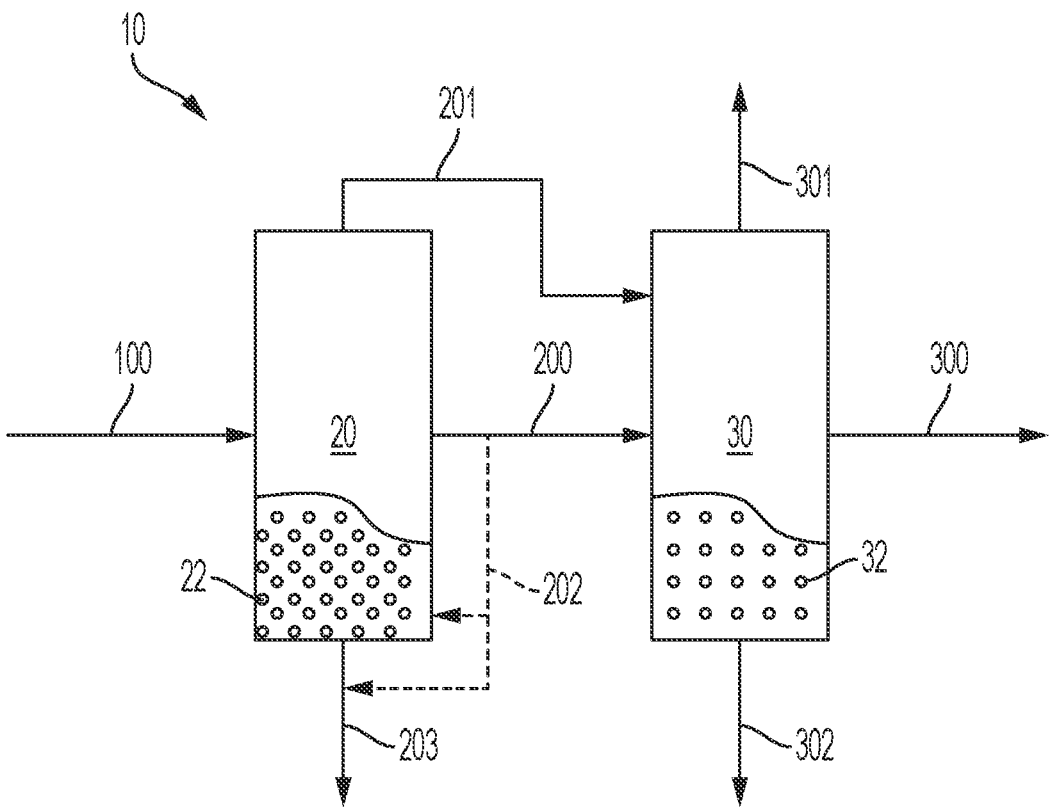
FIG. 1 depicts a generalized schematic diagram of an embodiment of a crude oil conversion system, according to one or more embodiments described in this disclosure.

For the purpose of describing the simplified schematic illustrations and descriptions of FIGS. 1-6, the numerous valves, temperature sensors, electronic controllers and the like that may be employed and well known to those of ordinary skill in the art of certain chemical processing operations are not included. Further, accompanying components that are often included in conventional chemical processing operations, such as refineries, such as, for example, air supplies, catalyst hoppers, and flue gas handling are not depicted. It should be understood that these components are within the spirit and scope of the present embodiments disclosed. Operational components, such as those described in the present disclosure, may be added to the embodiments described in this disclosure.

It should further be noted that arrows in the drawings refer to process streams. However, the arrows may equivalently refer to transfer lines which may serve to transfer process steams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIGS. 1-6. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Described in this disclosure are various embodiments of systems and methods for directly processing crude oil feedstock into value-added chemicals such as ethylene, propylene, butenes, and BTX (benzene, toluene, xylenes). Generally, the processing of the crude oil feedstock includes two stages that are tightly connected. In a first stage, contaminants in the crude oil feedstock, such as Conradson Carbon (CCR) and metals, are substantially removed and the boiling point distribution of the feedstock is lowered to facilitate its treatment in the second stage. In the second stage, selected effluents from the first stage are fed in a gaseous form directly into a catalytic cracking reactor to generate the value-added chemicals.

In accordance with embodiments of the present disclosure, a method for processing a crude oil feedstock includes a two stage process. A first stage includes introducing a crude oil stream to a reactive distillation unit to remove Conradson Carbon and metals from the crude oil stream. It will be appreciated that removal or reduction in Conradson Carbon means carbon constituents are removed such that the Conradson carbon value or Congradson carbon residue measured according to accepted standardized tests is reduced with Conradson carbon broadly including all carbon species measures by such tests. Further, the first stage generates a distillate stream having a mean boiling point distribution less than the crude oil stream, a light gas stream consisting of C1-C4 hydrocarbons, a heavy liquid fraction comprising atmospheric residue formed from hydrocarbons having a boiling point of 400° C. or greater, and coke. A second stage includes passing the distillate stream in a gaseous form in a continuous manner and without further processing to a catalytic cracking reactor. The catalytic cracking reactor has a cracking catalyst disposed therein that cracks the distillate stream to form a petrochemical product stream comprising light olefins and BTX, a light gas effluent consisting of hydrogen and C1-C4 alkanes, and an unconverted distillate stream comprising the remainder of the distillate stream passed to the catalytic cracking reactor unit. Further, the catalytic cracking reactor operates at a temperature of 300° C. to 800° C.

Having generally introduced the methods for processing a crude oil feedstock in accordance with the present disclosure, definition of various terms used through the present disclosure is provided.

As used in this disclosure, a "reactor" refers to a vessel in which one or more chemical reactions may occur between one or more reactants optionally in the presence of one or more catalysts. For example, a reactor may include a tank or tubular reactor configured to operate as a batch reactor, a continuous stirred-tank reactor (CSTR), or a plug flow reactor. Example reactors include packed bed reactors such as fixed bed reactors, and fluidized bed reactors. One or more "reaction zones" may be disposed in a reactor. As used in this disclosure, a "reaction zone" refers to an area where a particular reaction takes place in a reactor. For example, a packed bed reactor with multiple catalyst beds may have multiple reaction zones, where each reaction zone is defined by the area of each catalyst bed.

As used in this disclosure, a "separation unit" refers to any separation device that at least partially separates one or more chemicals that are mixed in a process stream from one another. For example, a separation unit may selectively separate differing chemical species from one another, forming one or more chemical fractions. Examples of separation units include, without limitation, distillation columns, flash drums, knock-out drums, knock-out pots, centrifuges, filtration devices, traps, scrubbers, expansion devices, membranes, solvent extraction devices, and the like. It should be understood that separation processes described in this disclosure may not completely separate all of one chemical consistent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided, or separated, into two or more process streams of desired composition. Further, in some separation processes, a "lesser boiling point fraction" (sometimes referred to as a "light fraction") and a "greater boiling point fraction" (sometimes referred to as a "heavy fraction") may exit the separation unit, where, on average, the contents of the lesser boiling point fraction stream have a lesser boiling point than the greater boiling point fraction stream. Other streams may fall between the lesser boiling point fraction and the greater boiling point fraction, such as an "intermediate boiling point fraction."

It should be understood that an "effluent" generally refers to a stream that exits a system component such as a separation unit, a reactor, or reaction zone, following a particular reaction or separation, and generally has a different composition (at least proportionally) than the stream that entered the separation unit, reactor, or reaction zone.

As used in this disclosure, a "catalyst" refers to any substance which increases the rate of a specific chemical reaction. Catalysts described in this disclosure may be utilized to promote various reactions, such as, but not limited to, cracking, demetalization, dearomatization, desulfurization, and, denitrogenation. As used in this disclosure, "cracking" generally refers to a chemical reaction where a molecule having carbon to carbon bonds is broken into more than one molecule by the breaking of one or more of the carbon to carbon bonds.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "hydrogen stream" passing from a first system component to a second system component should be understood to equivalently disclose "hydrogen" passing from a first system component to a second system component.

Now referring to FIG. 1, a hydrocarbon conversion system 10 is schematically depicted. The hydrocarbon conversion system 10 generally receives a crude oil stream 100 and directly processes the crude oil stream 100 to form a petrochemical product stream comprising light olefins and BTX. While the present description and examples may specify crude oil as the material of the crude oil stream 100, it should be understood that the hydrocarbon conversion systems 10 described with respect to the embodiments of FIGS. 1-6 are applicable for the conversion of a wide variety of feedstock hydrocarbons including whole crude oil or a crude oil fraction. The crude oil stream 100 utilized may be an Arab light crude oil. Example properties for one particular grade of Arab light crude oil are shown in Table 1.

TABLE 1

| Example of Arab Light Feedstock | | |
| --- | --- | --- |
| Analysis | Units | Value |
| American Petroleum Institute (API) gravity | degree | 33.7 |
| Density | grams per cubic centimeter (g/cm³) | 0.8566 |
| Sulfur Content | weight percent (wt. %) | 1.92 |
| Nickel | parts per million by weight (ppmw) | 4.43 |
| Vanadium | ppmw | 14.87 |
| Sodium Chloride (NaCl) Content | ppmw | 892 |
| Conradson Carbon | wt. % | 4.67 |
| C₅ Asphaltenes | wt. % | 3.3 |

In one or more embodiments, the crude oil stream 100 provided to the hydrocarbon conversion system 10 contains less than 10 weight percent (wt %) of CCR and less than 50 parts per million (ppm) of metals. For purposes of the present disclosure, the metals content is based upon the content of Nickel (Ni) and Vanadium (V). In various embodiments, the crude oil stream 100 provided to the hydrocarbon conversion system 10 contains less than 8 wt % of CCR, less than 6 wt % of CCR, less than 5 wt % of CCR, less than 3 wt % of CCR, or less than 2 wt % of CCR. Further, in various embodiments, the crude oil stream 100 provided to the hydrocarbon conversion system 10 contains less than 40 ppm of metals, less than 30 ppm of metals, less than 20 ppm of metals, or less than 10 ppm of metals. It is expressly noted that the variously disclosed CCR and metal contents may be combined in any manner and combination.

In one or more embodiments, the crude oil stream 100 provided to the hydrocarbon conversion system 10 may contain hydrocarbon with boiling point range within gasoline, diesel, vacuum gas oil (VGO), and residue fractions in variable amounts. It is noted that gasoline is considered as hydrocarbons with a boiling point range of initial boiling point (ibp) to 216° C., diesel is considered as hydrocarbons with a boiling point range of 216° C. to 360° C., VGO is considered as hydrocarbons with a boiling point range of 3600° C. to 538° C., and residue is considered as hydrocarbons with a boiling point range of greater than 538° C. VGO may be further delineated as light VGO from 360° C. to 450° C. and heavy VGO from 450° C. to 538° C.

The crude oil stream 100 may be passed to a reactive distillation unit 20 to remove conradson carbon and metals from the crude oil stream 100 and generate a distillate stream 200 having a mean boiling point distribution less than the crude oil stream 100. Specifically, a majority of the crude oil stream 100 is transformed into distillate stream 200 with a lower content of contaminants than the crude oil stream 100. In various embodiments, the distillate stream 200 may comprise at least 60 wt %, at least 65 wt %, at least 70 wt %, at least 75 wt %, or at least 80 wt % of the total effluents of the reactive distillation unit 20. It is noted that the distillate stream 200 is considered to be the hydrocarbons having a boiling point in the range of the ibp to an upper limit of between 300° C. and 538° C. In various embodiments, the upper limit may be 500° C., 475° C., 450° C., 425° C., or 400° C. As such, the distillate stream 200 does not include hydrocarbon gases present at standard temperature and pressure (STP) such as light gases including hydrogen, methane, ethane, ethylene, propane, propylene, butanes, and butylenes. Beyond the distillate stream 200, other products generated in the reactive distillation unit 20 include a light gas stream 201 consisting of C1-C4 hydrocarbons, a heavy liquid fraction 203 comprising atmospheric residue formed from hydrocarbons having a boiling point greater than the end point of distillate stream 200, and coke.

In one or more embodiments, the reactive distillation unit 20 is operated at a temperature that partially vaporizes the crude oil stream 100 to generate the various effluent streams including the distillate stream 200, the light gas stream 201, and the heavy liquid fraction 203. In one or more embodiments, the reactive distillation unit 20 is operated at a temperature in the range of 300° C. to 500° C. In various further embodiments, the reactive distillation unit 20 is operated at a temperature in the range of 300° C. to 450° C., 340° C. to 450° C., 380° C. to 450° C., or 420 to 450° C. At these operational temperatures, gasoline, diesel and a part of light vacuum gas oil (VGO) fractions will evaporate and form a part of the distillate stream 200 that is directed to a catalytic cracking reactor 30 forming a second stage of the presently disclosed process.

It will be appreciated that the cut point of the distillate stream 200 is dependent on the temperature and pressure in the reactive distillation unit 20. The cut point for the distillate stream 200 may be regulated by the operating temperature and pressure of the reactive distillation unit 20. Selection of the cut point for the distillate steam 200 may be made based on the catalyst present in the catalytic cracking reactor 30 forming the second stage of the presently disclosed process. A greater, colloquially referenced as higher, cut point temperature may lead to excessive coking of the catalysts in the catalytic cracking reactor 30. Conversely, a lesser, colloquially referenced as lower, cut point would decrease distillate stream 200 yield. Specifically, usable hydrocarbons such as heavy diesel or light VGO would be lost in the heavy liquid fraction 203. As such, the cut point may be selected in view of the catalyst or catalysts used in the catalytic cracking reactor 30.

The processing in the reactive distillation unit 20 may be carried out at atmospheric pressure. Alternatively, some pressure can be applied that will change the cut point of the distillate stream 200. In one or more embodiments, the reactive distillation unit 20 is operated at a pressure in the range of 1 to 20 bars absolute. In various further embodiments, the reactive distillation unit 20 is operated at a pressure in the range of 1 to 15 bars absolute, 1 to 12 bars absolute, 1 to 8 bars absolute, 1 to 5 bars absolute, or 1 to 3 bars absolute. At the operational temperatures and pressures, gasoline, diesel and a part of light vacuum gas oil (VGO) fractions will evaporate and form a part of the distillate stream 200 that is directed to a catalytic cracking reactor 30 forming a second stage of the presently disclosed process.

It is noted that increasing pressure in reactive distillation unit 20 allows for an increase in operational temperature in the reactive distillation unit 20 as well while the cut point of distillate stream 200 is maintained. As processing temperature in reactive distillation unit 20 and the cut point desired for the distillate stream 200 may be slightly different, pressure manipulation may be utilized to allow for operation at a desired temperature. For example, VGO components in the 400° C. to 500° C. range that are desirably cracked before passage to the cracking reactor may be evaporated and flowed out of the reactive distillation unit 20 at atmospheric pressure. They may be refluxed to the reactor within the reactive distillation unit 20 at the reactor bulkhead, but it may be more efficient to increase pressure slightly above atmospheric to maintain them in a liquid state until they are cracked into lighter hydrocarbons for inclusion in the distillate stream 200 or light gas stream 201. Increasing pressure slightly above atmospheric, such as 1 to 3 bars, in the reactive distillation unit 20 allows for manipulation of the distillate cut point and processing temperature.

In one or more embodiments, a portion of the heavy liquid fraction 203 is vaporized in the reactive distillation unit 20 based on the operating temperatures but is not desired to be transferred to the catalytic cracking reactor 30 along with the distillate stream 200. As such, the portion of the heavy liquid fraction 203 vaporized in the reactive distillation unit 20 is condensed before entering the catalytic cracking reactor 30 to form condensed stream 202. Specifically, the operating temperature and pressure of the reactive distillation unit 20 may result in components with boiling points greater than those of the distillate stream 200 being vaporized as well such that the entire heavy liquid fraction 203 is not in liquid form. For example, the distillate stream 200 may comprise hydrocarbons with boiling points as great as 400° C., but the reactive distillation unit 20 may operate at 500° C. resulting in the 400° C. to 500° C. boiling hydrocarbons also being vaporized. Condensing such hydrocarbons to form condensed stream 202 allows for them to be combined back with the heavy liquid fraction 203.

Figure 3:
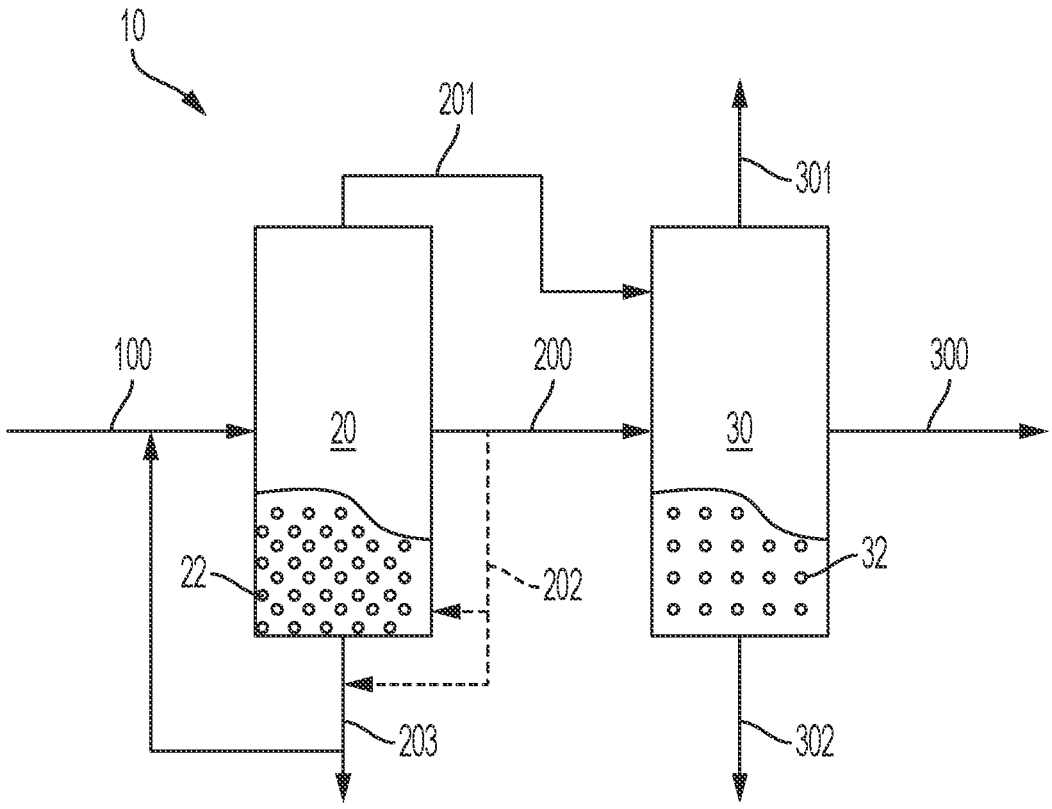
FIG. 3 depicts a generalized schematic diagram of another embodiment of a crude oil conversion system, according to one or more embodiments described in this disclosure.
Figure 4:
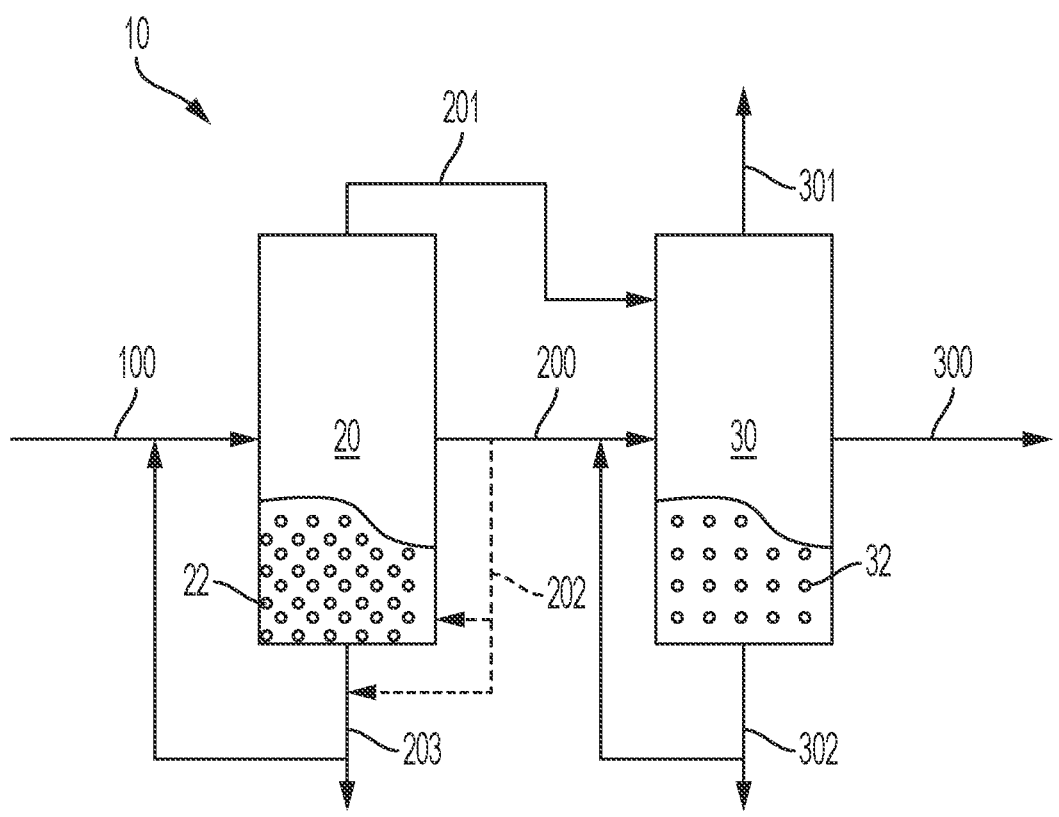
FIG. 4 depicts a generalized schematic diagram of another embodiment of a crude oil conversion system, according to one or more embodiments described in this disclosure.
Figure 5:
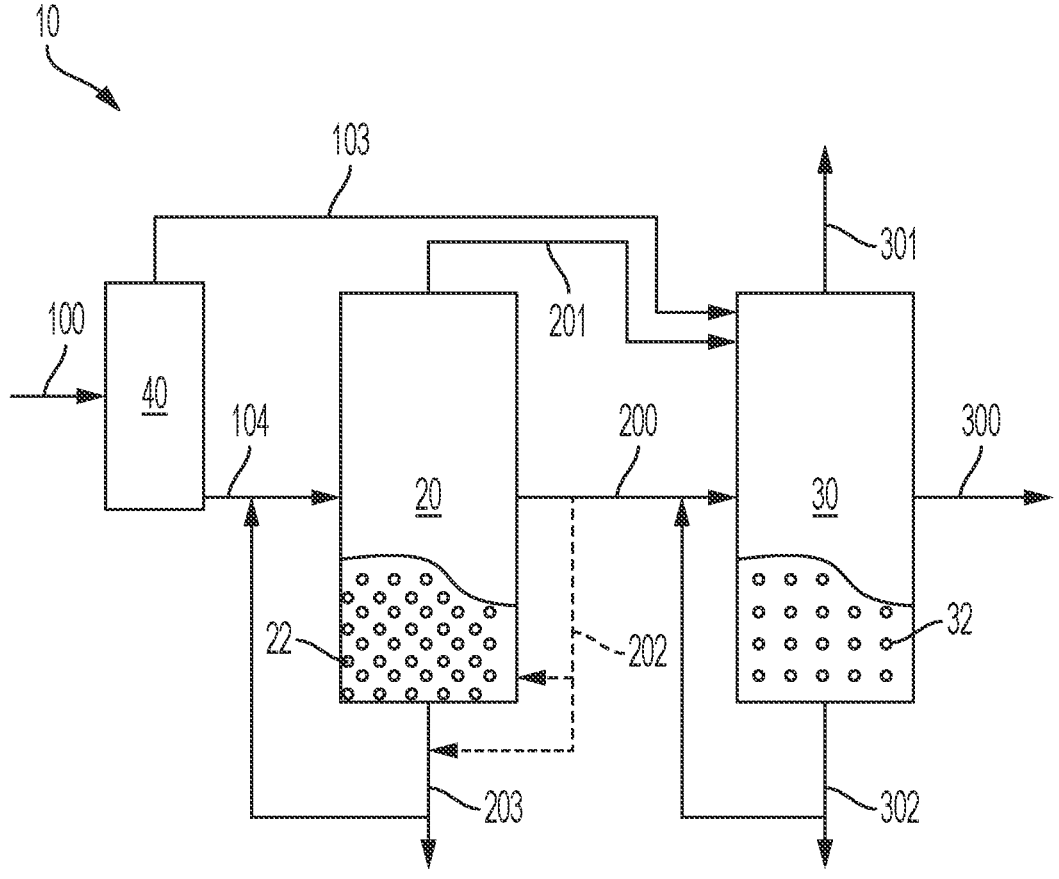
FIG. 5 depicts a generalized schematic diagram of another embodiment of a crude oil conversion system, according to one or more embodiments described in this disclosure.

In one or more embodiments and with reference to FIGS. 3 through 5, the heavy liquid fraction 203 is at least partially recycled back to the reactive distillation unit 20 to allow for further processing and cracking of the hydrocarbons in the heavy liquid fraction 203 into hydrocarbons having a boiling point range commensurate with the distillate stream 200. In one or more embodiments, the heavy liquid fraction 203 is recycled back to the reactive distillation unit 20 to extinction. In various further embodiments, condensed stream 202 is not combined with the heavy liquid fraction 203 and is instead fully recycled back to the reactive distillation unit 20 with all, some, or none of the heavy liquid fraction 203.

Cracking of the various hydrocarbons provided to the reactive distillation unit 20 may occur thermally or catalytically. In one or more embodiments, the reactive distillation unit 20 includes a catalyst. In further embodiments, the reactive distillation unit 20 cracks the various hydrocarbons provided as feed streams solely based on thermal cracking. Cracked products generated in the reactive distillation unit 20 include gasoline, diesel and light VGO range products forming distillate stream 200; hydrogen, methane, ethane, propane, propylene, butanes, and butylenes forming light gas stream 201, the heavy liquid fraction 203, and coke which is accumulated in the reactive distillation unit 20. In one or more embodiments, the light gas stream 201 may additionally include C5 hydrocarbons.

In various embodiments, the excess of unconverted liquid fraction can be removed periodically or continuously from the reactive distillation unit 20 forming heavy liquid fraction 203. The heavy liquid fraction 203 can be diverted to another conversion process, for example catalytic cracking, hydrocracking, delayed coking, or fluid coking. Alternatively, the heavy liquid fraction 203 may be recycled to extinction in the reactive distillation unit 20.

During thermal cracking of the crude oil stream 100, and any other hydrocarbon feeds, in the reactive distillation unit 20, coke may deposit on internal surfaces of the reactive distillation unit 20. The deposition of coke on reactor surfaces typically necessitates periodic shut down and decoking operations. In one or more embodiments, the reactive distillation unit 20 comprises solid particles 22 disposed within the reactive distillation unit 20. For conciseness and clarity the solid particles 22 are only illustrated in the Figures at a bottom portion of the reactive distillation unit 20, but it will be appreciated that the solid particles 22 may fill all or only a portion of the reactive distillation unit 20. The solid particles may function to catch preferentially the contaminants of the feedstock, in particular CCR and metals. Further, coke generated in the reactive distillation unit 20 will build on the solid particles 22 instead of the internal surfaces of the reactive distillation unit 20.

In one or more embodiments, the solid particles 22 are extracted periodically from the reactive distillation unit 20. In further embodiments, the solid particles 22 are extracted continuously from the reactive distillation unit 20. For example, the solid particles 22 may be removed from the reactive distillation unit 20 along with the heavy liquid fraction 203 on a period or continuous basis. The solid particles 22 may then be separated from the liquid oil forming the heavy liquid fraction 203 by any suitable means known to one skilled in the art for separation of solid and liquid mediums. For example, the solid particles 22 and the heavy liquid fraction 203 may be separated via filtration. After the solid particles 22 are separated, coke and other build-up on the solid particles 22 may be removed by any suitable means known to one skilled in the art for removing coke. For example, coke may be removed from the solid particles 22 via combustion. After removal of the coke from the solid particles 22, the solid particles 22 may be recycled back to the reactive distillation unit 20. An advantage provided by disposing the solid particles 22 in the reactive distillation unit 20 is such deployment limits the deposition of coke on the reactor internals, capturing it instead on the surface of the solid particles 22, so that the frequency of decoking operations can be decreased or even completely avoided.

In one or more embodiments, the solid particles 22 may also provide catalytic cracking activity. Specifically, the solid particles 22 may also be a cracking catalyst. The solid particles 22 providing cracking activity may increase the conversion rate of the crude oil stream 100 and the recycled heavy liquid fraction 203, if present. Further, forming the solid particles 22 from a material with catalytic cracking activity may yield different products than thermal cracking along, including more light olefins and lighter distillate. Coke yield may also increase in the presence of solid particles 22 with catalytic cracking activity drawing more coke and coke precursors out of the distillate stream 200 provided to the catalytic cracking unit 30 where formation of coke is undesirable. In one or more embodiments, the solid particles 22 comprise an inorganic oxide. For example, in one or more specific embodiments, the solid particles 22 comprise kaolin, silica, alumina, silica alumina, silica-alumina doped with phosphorus, magnesium oxide, titania, zirconia, alumina-magnesia spinel, hydrotalcite, and molecular sieves and mixtures thereof. The solid particles 22 may be formed into particles or pellets that make them more resistant to attrition and facilitate transportation inside the reactor vessel forming the reactive distillation unit 20.

The distillate stream 200 may be passed to the catalytic cracking reactor 30 to crack the distillate stream 200 to form a petrochemical product stream 300. Specifically, the distillate stream 200 enters the catalytic cracking reactor 30 where it is catalytically cracked to yield a majority of chemicals such as light olefins such as ethylene, propylene, butenes as well as benzene, toluene and xylenes (BTX) forming the petrochemical product stream 300. A light gas effluent 301 is also generated consisting of hydrogen and C1-C4 alkanes such as methane, ethane, propane and butanes. A further stream, an unconverted distillate stream 302, is also generated. The unconverted distillate stream 302 is formed from the remainder of the distillate stream 200 passed to the catalytic cracking reactor unit 30 after removal of the petrochemical product stream 300 and the light gas effluent 301.

It is noted that the distillate stream 200 is passed in a gaseous form and in a continuous manner without further processing to the catalytic cracking reactor 30 from the reactive distillation unit 20. It is important that the distillate stream 200 is removed continuously from the reactive distillation unit 20 and directed in an expeditious manner to the catalytic cracking reactor 30 to limit over-cracking of the distillate stream 200. Specifically, if the residence time of products is too long in the reactive distillation unit 20, selectivity to low boiling point hydrocarbons such as dry gas, liquefied petroleum gas (LPG). and light gasoline from excessive cracking, and to coke may result. Such is undesirable as over generation of low boiling point hydrocarbons and coke inhibits production of the petrochemical product stream 300 including light olefins and mono-aromatics in the catalytic cracking reactor 30 diminishing yields of such desirable products. In various embodiments, the residence time of the crude oil stream 100 in the reactive distillation unit 20 may be on the order of 1 minute to 60 minutes, 1 minute to 30 minutes, 2 minutes to 45 minutes, 5 minutes to 60 minutes, 5 minutes to 30 minutes, or 5 minutes to 20 minutes depending on the processing temperature.

Figure 6:
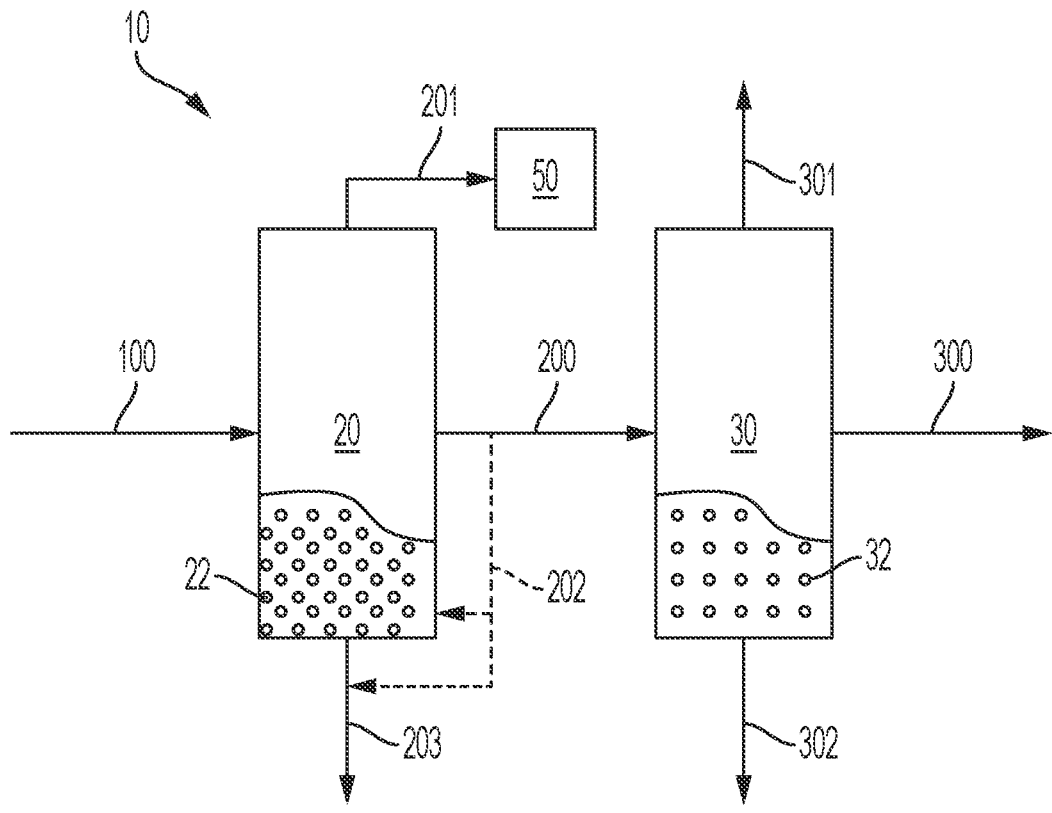
FIG. 6 depicts a generalized schematic diagram of another embodiment of a crude oil conversion system, according to one or more embodiments described in this disclosure.

In one or more embodiments, the light gas stream 201 is passed concurrently with the distillate stream 200 to the catalytic cracking reactor 30. It will be appreciated that the light gas stream 201 and the distillate stream 200 may be provided as separate streams to the catalytic cracking reactor 30. Such arrangement allows for control over the composition of the feed to the catalytic cracking reactor 30 as passage of the light gas stream 201 may be modulated to achieve a desired hydrocarbon blend. Alternatively, the light gas stream 201 and the distillate stream 200 may be combined into a single stream before passage to the catalytic cracking reactor 30. In one or more further embodiments, as illustrated in FIG. 6, the light gas stream 201 may be diverted from the catalytic cracking reactor 30 and provided to a different processing unit such as a steam cracker 50.

In various embodiments, the catalytic cracking reactor 30 may comprise fixed, fluidized or transported catalytic beds. In one or more specific embodiments, the catalytic cracking reactor 30 is a fixed bed reactor. One skilled in the art understands that catalytic cracking operations are generally carried out in transported beds. Cracking in transported beds has generally been rendered necessary by the significant amount of coke generated in the traditional operation of chemical plants. Specifically, when vacuum gas oil (VGO) is contacted with an acid catalyst in a reactor working at temperature in the range of 480° C. to 550° C. temperature range significant coke is traditionally generated. The catalyst provided in traditional operating processes then loses most of its activity in a few seconds. However, the hydrocarbon conversion system 10 and operation in accordance with the present disclosure leverage the understanding that the lighter the boiling point range of the feed to a catalytic cracking process, the lower the coke yield. The composition of the distillate stream 200 generated by processing the crude oil stream 100 in the reactive distillation unit 20 prior to passage to the catalytic cracking reactor 30 combined with the nature of the catalyst in the catalytic cracking reactor 30 decreases coke yield to very low levels compared to Fluid Catalytic Cracking. In various embodiments, the coke yield may be less than 3 wt %, less than 2 wt %, less than 1 wt. %, or less than 0.5 wt % of the crude oil stream 100. Therefore, catalyst deactivation is much slower and continuous operation is possible for an extended duration in a fixed bed or fluidized bed reactor in accordance with the present disclosure. Further, it is noted, the very low coke yield would make it difficult to run a heat-balanced circulating bed process such as in a fluidized catalytic cracking unit (FCCU) without considerable inputs of additional fuel.

In one or more embodiments, the catalytic cracking reactor 30 is operated at a temperature in the range of 300° C. to 800° C. In various further embodiments, the catalytic cracking reactor 30 is operated at a temperature in the range of 350° C. to 750° C., 400° C. to 725° C., 500° C. to 700° C., or 550 to 670° C. Further, in one or more embodiment, two or more catalyst beds may be present and heated at different temperatures. In accordance with one or more embodiments of such arrangement, a first catalyst bed may be operated at a lower temperature than subsequent beds. For example, the first catalyst bed may operate at a temperate in the range of 400° C. to 650° C. or 500° C. to 600° C. with a second catalyst bed operated at a greater temperate in the range of 500° C. to 750° C. or 600° C. to 700° C.

Without wishing to be bound by theory, it is noted that catalytic cracking reactor 30 may be operated under pressure but it is preferred to work at the lowest possible pressure to limit hydrogen transfer reactions. Hydrogen transfer reaction may saturate olefins, lowering the yield of chemicals of interest as well as increasing the rate of coke formation that will accelerate catalyst deactivation. Accordingly, in one or more embodiments, the catalytic cracking reactor 30 is operated at pressure in the range of 0.5 to 10 bars absolute. In various further embodiments, the catalytic cracking reactor 30 is operated at pressure in the range of 1 to 10 bars absolute, 0.5 to 8 bars absolute, 0.5 to 5 bars absolute, or 1 to 3 bars absolute.

In one or more embodiments, a diluent may be introduced in the catalytic cracking reactor 30 along with the distillate stream 200 to decrease hydrocarbon partial pressure and reduce residence time in the catalytic cracking reactor 30. It will be appreciated that the residence time in the catalytic cracking reactor 30 should be selected to obtain sufficient conversion with a single pass without undesirably excess thermal cracking of the feed. In various embodiments, the residence time in the catalystic cracking unit may be 3 seconds to 3 minutes, 3 seconds to 1 minute, 5 seconds to 3 minutes, 5 seconds to 1 minute, or 3 seconds to 30 seconds. In one or more embodiments, the diluent may be an inert gas. In one or more embodiments, the diluent may be water vapor.

The catalytic cracking reactor 30 includes a cracking catalyst 32 disposed therein that cracks the distillate stream 200 to form the petrochemical product stream 300. For conciseness and clarity the cracking catalyst 32 is only illustrated in the Figures at a bottom portion of the catalytic cracking reactor 30, but it will be appreciated that the cracking catalyst 32 may fill all or only a portion of the catalytic cracking reactor 30.

In one or more embodiments, the cracking catalyst 32 for the catalytic cracking of the distillate stream 200 includes alumina, silica alumina, silica-alumina doped with phosphorus, magnesium oxide, titania, zirconia, alumina-magnesia spinel or hydrotalcite, molecular sieves and mixtures thereof.

In one or more embodiments, the cracking catalyst 32 for the catalytic cracking of the distillate stream 200 is a zeolite or a mixture of zeolites. Example zeolites include zeolite Y, beta, ITQ21, MFI, ITQ13, IM5, theta, mordenite, and ferrierite. In one or more embodiments, the cracking catalyst 32 comprises a blend of large pore zeolite and medium pore zeolite. Usage of a large pore zeolite yields products of lower boiling point and the medium pore zeolites promote selective cracking of gasoline and light diesel components into light olefins and BTX. As such, the large pore zeolites and medium pore zeolites work together to generate the desired light olefins and BTX from the distillate stream 200. Examples of suitable large pore zeolites with pores and cavities of 12 or more member-rings include zeolite Y, beta, and ITQ21. Example medium pore zeolites include MFI, ITQ13, IM5, theta, mordenite, and ferricrite. It will be appreciated that medium pore zeolites usually yield less coke than large pore zeolites, but may be more sensitive to coking due to mass transfer limitations, especially in zeolites having mono or bi-dimensional pore network.

In one or more embodiments, the zeolites forming the cracking catalyst 32 may be in the form of small crystals ranging from 5 nanometers to 5 micrometers. For example, the zeolites may comprise nanocrystals with a largest dimension in the range of 5-50 nanometers. Further, in one or more embodiments, the cracking catalyst 32 may include one or more transition metals loaded in a medium pore zeolite to increase dehydrogenation activity, thereby enhancing the yield of aromatics. Transition metal may be chosen from group 4 to 12 and may include Ni, Cr, Mo, Mn, Zn, Ga, Cu, Fe, or a combination of them, at a concentration of 0.1 to 10 wt. %. Further, precious metal such as Pt, may be added at concentrations of 1 ppm to 1 wt. % in consideration of cost.

In one or more embodiments, the cracking catalyst 32 comprises a blend of Y-zeolite and ZSM-5. In various embodiments, the cracking catalyst 32 comprises a blend of Y-zeolite and ZSM-5 at a ratio of 90:10 to 50:50 by weight, 85:15 to 60:40 by weight, 80:20 to 60:40 by weight, 80:20 to 70:30 by weight, or approximately 75:25 by weight.

In various embodiments, the cracking catalyst 32 is arranged in the catalytic cracking reactor in a single bed, or in several stacked beds. Further, the composition of the stacked beds may be different and the temperature of each stacked bed during operation may also be different. For example, as previously noted, one catalyst bed may be heated at a temperature in the range of 400° C. to 650° C. and a subsequent catalyst bed may be heated at a temperature in the range of 500° C. to 750° C. Further, in one or more embodiments, the catalytic cracking reactor 30 may be formed from a series of individual reactors, each reactor having a different cracking catalyst 32 and operating at a different temperature.

In one or more embodiments where the catalytic cracking reactor 30 is formed of multiple stacked beds, a first catalyst bed may contain a large pore zeolite with the second and subsequent catalyst beds of the catalytic cracking reactor 30 containing medium pore zeolites. As previous indicated, the large pore zeolites that promote cracking of the heaviest components of the distillate stream 200 allowing the medium pore zeolites to promote selective cracking of gasoline and light diesel components into light olefins and BTX.

During operation, coke may form on the cracking catalyst 32 resulting in loss of activity with time. As such, it is necessary to periodically remove the coke on the cracking catalyst 32 to restore the activity and effectiveness of the cracking catalyst 32. In one or more embodiments, decoking of the reactive distillation unit 20 and the catalytic cracking reactor 30 is carried out simultaneously. Specifically, operation of the hydrocarbon conversion system 10 is terminated such that the reactive distillation unit 20 and the catalytic cracking reactor 30 may both be decoked. In accordance with one or more further embodiments, a multiplicity of reactors in the reactive distillation unit 20 are connected to a multiplicity of reactors forming the catalytic cracking reactor 30 such that operation of the hydrocarbon conversion system 10 can be continuous with some reactors in a regeneration phase and others in a reaction phase. Regeneration of the catalyst in second stage reactor 20 may be carried out by any suitable mean. Specifically, parallel reactors or units in each of the reactive distillation unit 20 and the catalytic cracking reactor 30 allows for at least one reactor or unit to operation in each of the reactive distillation unit 20 and the catalytic cracking reactor 30 while the remainder are decoked. It is noted that the present of the solid particles 22 disposed within the reactive distillation unit 20 allows for the reactive distillation unit 20 to operate continuously in one or more embodiments only necessitating parallel catalytic cracking reactors 30 to achieve continuous operation.

Figure 2:
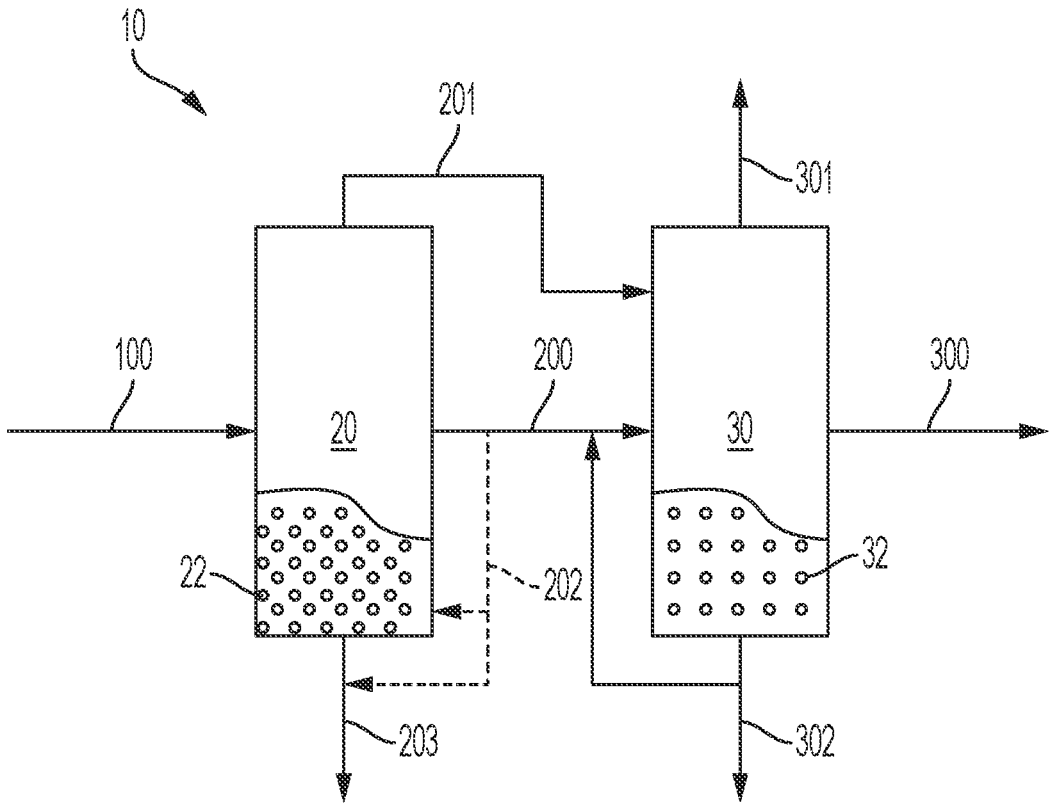
FIG. 2 depicts a generalized schematic diagram of another embodiment of a crude oil conversion system, according to one or more embodiments described in this disclosure.

In one or more embodiments and with reference to FIGS. 2, 4, and 5, at least a portion of the unconverted distillate stream 302 may be recycled back to the catalytic cracking reactor 30 for further processing. Specifically, the catalytic cracking reactor 30 may further crack the hydrocarbons forming the unconverted distillate stream 302 to generate additional hydrocarbons for provision in the petrochemical product stream 300 and the light gas effluent 301.

In one or more embodiments and with reference to FIGS. 1 through 6, the unconverted distillate stream 302 may be diverted toward other units such as reformers, aromatics dealkylation units, or naphthalene soft hydrocracking units for further conversion into chemicals.

The unconverted distillate stream 302 may contain other chemicals of interest beyond those provided in the petrochemical product stream 300 such as alkyl-aromatics with 9 or more carbon atoms, and naphthalenes that are worth recovering. As such, in one or more embodiments, the unconverted distillate stream 302 may be collected or processed with a separation unit to recover the additional valuable chemicals.

In one or more embodiments, and with reference to FIG. 5, the crude oil stream 100 may be introduced to a feedstock separator 40 which separates the contents of the crude oil stream 100 into a lesser boiling point hydrocarbon fraction stream 103 and a greater boiling point hydrocarbon fraction stream 104. In one or more embodiments, the feedstock feedstock separator 40 may be a vapor-liquid separator such as a flash drum (sometimes referred to as a breakpot, knock-out drum, knock-out pot, compressor suction drum, or compressor inlet drum). In such an embodiment utilizing a vapor-liquid separator as the feedstock separator 40, the lesser boiling point hydrocarbon fraction stream 103 exits the feedstock separator 40 as a vapor and the greater boiling point hydrocarbon fraction stream 104 exits the feedstock separator 40 as a liquid. The vapor-liquid separator may be operated at a temperature suitable to separate the crude oil stream 100 into the lesser boiling point hydrocarbon fraction stream 103 and the greater boiling point hydrocarbon fraction stream 104 at a cut point in the range of pentanes to the end point of distillate 200. For example, the contents of the lesser boiling point hydrocarbon fraction stream 103 may have a boiling point of ibp to less than or equal to 50° C., less than or equal to 150° C., less than or equal to 220° C., less than or equal to 300° C., or less than or equal to 400° C. The contents of the greater boiling point hydrocarbon fraction stream 104 may have a boiling point of at least 50° C., at least 150° C., at least 300° C., or at least 400° C. The greater boiling point hydrocarbon fraction stream 104 may be provided to the reactive distillation unit 20 and the lesser boiling point hydrocarbon fraction stream 103 may be provided directly to the catalytic cracking reactor 30. Without wishing to be bound by theory, it has been experimental noted that retaining some lighter hydrocarbons in the greater boiling point hydrocarbon fraction stream 104 decreases coke formation in the reactive distillation unit 20 such that the cut point should not be recessively high as to remove all lighter hydrocarbons as reflected in the disclosed cut point ranges.

It will be appreciated that the hydrocarbon conversion system 10 in accordance with the present disclosure provide advantages over a straight steam cracking process. In particular, the two-stage process with generation of the distillate stream 200 in the reactive distillation unit 20 before passage to the catalytic cracking reactor 30 introduces increased flexibility to determine the product slate of the crude to chemicals process. For example, such process allows for the possibility to increase the propylene to ethylene ratio far beyond the traditionally values obtained during the steam cracking process. Further, the hydrocarbon conversion system 10 allows for a decrease in the operating temperature of the cracking process relative to steam cracking processes. A reduction in the operating temperature limits the heat losses and the material strain during the overall conversion operations. Further, the hydrocarbon conversion system 10 is function to for direct conversion of whole crude oil with less coking issues than other process such as steam cracking where heavier fractions are typically just discarded and not converted into useful products.

EXAMPLES

The various embodiments of methods and systems for processing a crude oil feedstock will be further clarified by the following examples. The examples are illustrative in nature, and should not be understood to limit the subject matter of the present disclosure.

Initially processing of Arabian light crude oil in a reactive distillation unit in accordance with methods of the present disclosure was undertaken to demonstrate the increased generation of lighter hydrocarbons in accordance with the distillate stream by processing in the reactive distillation unit in Examples 1 and 2. Further. Illustrative examples of distillate cracking are present in Examples 3 and 4.

Example 1

Arabian light crude oil, 12 grams (g), was introduced in a semi-batch reactor and subjected to heating. The setup constituted a quartz vessel containing the liquid hydrocarbon, a distillation head, a collector to recover distillate, a gas bag for the uncondensed gases in the collector and a syringe pump to inject fresh feed in the system. When the crude oil began to boil and the lighter fraction began to distillate, fresh Arabian light crude oil was pumped continuously into the reactor at a rate of 0.5 ml/min to maintain a constant amount of liquid in the bottom of the vessel, while lighter fractions were continuously distilled. The vessel was progressively heated to 440° C. and maintained at this temperature, while Arabian light crude oil was continuously injected and the light fraction distilled. Steady state was maintained up to the end of the injection of the Arabian light crude oil. Then the remaining liquid in the vessel was reacted at 440° C. for another 3 hours before the system was cooled down. The heavy liquid products remaining in the reactor vessel were recovered and filtered to separate solid coke, which was dried and weighted. The filtered liquid was then analyzed by simulated distillation (SIMDIS), as well as the distillate in the collector. Gases were analyzed by gas chromatography (GC). The feed composition of the Arabian light crude oil and the resulting products after processing are reported in Table 2.

In classifying the fraction, each fraction was defined as follows: light distillate (ibp-216° C.), heavy distillate (216-400° C.), light VGO (400-450° C.), heavy VGO (450-538° C.) and residue (boiling point greater than 538° C.). All liquid material having a boiling point below 400° C., that is the light and heavy distillate fraction, were considered as a distillate stream according to the present disclosure. It is noted this corresponds to hydrocarbons compounds with up to 25 carbon atoms in the chain.

TABLE 2

| Stream (wt. %) | Feed Arab Light Crude Oil | Example 1 |
|---|---|---|
| Light Gases | — | 2.3 |
| Light distillate (ibp-216) | 30.9 | 36.9 |
| Heavy distillate (216-400) | 35.6 | 47.3 |
| Atmospheric residue (400° C.+) | 33.5 | 8.0 |
| Light VGO (400-450° C.) | 8.9 | 4.0 |
| Heavy VGO (450-538° C.) | 12.9 | 2.5 |
| Residue (538+) | 11.7 | 1.5 |
| Coke | — | 5.5 |
| Distillates (ibp-400° C.) | 66.5 | 84.2 |

It is noted in Table 2 that after treatment, the amount the original feed that would be included in the distillate stream for provision to the cracking catalyst reactor increased from 66.5 wt % with direct distillation of crude oil to 84.2 wt % of the crude oil when it is treated as proposed in the present disclosure. Sub-products included a low gas yield of 2.3 wt % which corresponded mainly to methane which can be transferred along with the distillate without negative impact on catalytic cracking reactor and 5.5 wt % of coke. Remaining unconverted crude oil was 8.0 wt % which would represent the heavy liquid fraction.

Example 2

Arabian light crude oil, 15 grams (g), was introduced in a semi-batch reactor with a silica alumina catalyst and subjected to heating. The silica alumina catalyst containing 25 wt % alumina was calcined at 500° C. prior to placement in the semi-batch reactor. Before loading the Arabian light crude oil, the silica alumina catalyst was loaded in the reactor vessel. The mixture was progressively heated to 420° C., and held at this temperature for 3 hours. Fresh Arabian light crude oil was not added during the test. In a similar way to Example 1, product analysis was performed to compare the feed composition of the Arabian light crude oil and the resulting products after processing as reported in Table 3.

TABLE 3

| Stream (wt. %) | Feed Arab Light Crude Oil | Example 1 |
|---|---|---|
| Light Gases | — | 2.5 |
| Light distillate (ibp-216) | 30.9 | 37.8 |
| Heavy distillate (216-400) | 35.6 | 46.3 |
| Atmospheric residue (400° C.+) | 33.5 | 5.9 |
| Light VGO (400-450° C.) | 8.9 | 3.9 |

TABLE 3-continued

| Stream (wt. %) | Feed Arab Light Crude Oil | Example 1 |
|---|---|---|
| Heavy VGO (450-538° C.) | 12.9 | 1.7 |
| Residue (538+) | 11.7 | 0.3 |
| Coke | — | 7.5 |
| Distillates (ibp-400° C.) | 66.5 | 84.1 |

It is noted in Table 3 that after treatment, the amount the original feed that would be included in the distillate stream for provision to the cracking catalyst reactor increased from 66.5 wt % with direct distillation of crude oil to 84.1 wt % of the Arabian light crude oil when it is treated as proposed in the present disclosure. While gas yield was similar to Example 1, coke yield in the presence of the catalyst increased to 7.5 wt %. The use of the catalyst resulted in a lower yield of atmospheric residue in the products as well, 5.9 wt %. In particular, the residual fraction representing hydrocarbons with a boiling point greater than 538° C. was reduced to 0.3 wt %.

Example 3

A sample of the distillate obtained in Example 1 was cracked in a fixed bed containing 1.3 g of a combination of zeolite Y and ZSM5, with a weight ratio of 3:1. The zeolite powder was pelletized before mixing with silicon carbide particles of similar size to reach a total bed weight of 10 grams. The catalyst in the reactor was separated in two beds, with the first bed containing the Y zeolite and the second bed containing the ZSM5 zeolite. Each bed had an independent heating source comprising an electrical furnace with several heating zones, where each zone can reach a different temperature. The distillate provided from Example 1 was fed to the reactor at atmospheric pressure, a temperature of 650° C. for each bed, and a space velocity of 5 h$^{-1}$ calculated on the total amount of zeolite in the reactor. Nitrogen at 15 milliliters per minute (ml/min) was fed to the reactor together with the distillate. Injection was continued for 6 hours. Products fractions of both gas and liquids were continuously recovered, and mass balances were performed at regular intervals. Then, the average yields of products over the whole run length were determined. The product yields are summarized in Table 4. It is noted that more than 50 wt % of the distillate of Example 1 that was fed into the reactor during Example 3 was transformed into light olefins and BTX.

TABLE 4

| Stream | Yield (wt. % of Distillate Feed) |
|---|---|
| H$_2$ and CH$_4$ | 9.03 |
| Ethane, Propane, and Butane | 7.80 |
| Ethylene | 12.31 |
| Propylene | 18.76 |
| Butenes | 10.85 |
| Gasoline (ibp to 216° C.) | 30.38 |
| BTX component | 10.90 |
| LCO (216° C.-359° C.) | 8.78 |
| HCO (359° C.-fbp) | 1.31 |
| Coke | 0.67 |
| Light Olefins and BTX | 52.82 |

The final yields from the complete operation of the presently disclosed process integrating crude oil reactive distillation in a first stage reactor and then catalytic cracking of the distillate in a second stage reactor were calculated. For this purpose, the yields of chemicals of Table 4 were corrected with the yield of distillate obtained from Example 1, that is 84.2 wt % from Example 1. In addition, the light olefins yield from the first stage reactive distillation, that is 0.07 wt %, 0.21 wt %, and 0.14 wt % of ethene, propene and butenes, respectively, were added back into the total as collected products. Table 5 summarizes the yields of value added petrochemicals for the integrated process as weight percent of the crude oil processed. The results indicate that 44.9 wt % of the crude oil is converted into light olefins and BTX.

TABLE 5

| Stream | Yield (wt. % of Crude Oil Feed) |
|---|---|
| Ethylene | 10.4 |
| Propylene | 16.0 |
| Butenes | 9.3 |
| BTX | 9.2 |
| Total Light Olefins and BTX | 44.9 |

Example 4

A sample of the distillate obtained in Example 1 was treated is a similar manner as with Example 3, but with a higher temperature in the bed of ZSM 5. Specifically, a sample of the distillate obtained in Example 1 was cracked in a fixed bed containing 1.3 g of a combination of zeolite Y and ZSM5, with a weight ratio of 3:1. The zeolite powder was pelletized before mixing with silicon carbide particles of similar size to reach a total bed weight of 10 grams. The catalyst in the reactor was separated in two beds, with the first bed containing the Y zeolite and the second bed containing the ZSM5 zeolite. Each bed had an independent heating source. [INVENTORS: What type of heating source?] The distillate provided from Example 1 was fed to the reactor at atmospheric pressure, a temperature of 650° C. for the zeolite Y bed, a temperature of 700° C. for the ZSM5 bed, and a space velocity of 5 h$^{-1}$ calculated on the total amount of zeolite in the reactor. Nitrogen at 15 milliliters per minute (ml/min) was fed to the reactor together with the distillate. Injection was continued for 6 hours. Products fractions of both gas and liquids were continuously recovered, and mass balances were performed at regular intervals. Then, the average yields of products over the whole run length were determined. The product yields are summarized in Table 6.

It is noted that the product slate was modified compared to Example 3 given the increased cracking severity from operation of the ZSM5 bed at a temperature of 700° C. Accordingly, the operation in accordance with Example 4 produced more ethylene and less propylene and butenes compared to Example 3, while the total of light olefins and BTX was similar. Methane and hydrogen yields increased substantially due to the more severe cracking conditions. However, coke yield did not increase substantially in spite of the more severe operation.

TABLE 6

| Stream | Yield (wt. % of Distillate Feed) |
|---|---|
| H$_2$ and CH$_4$ | 17.98 |
| Ethane, Propane, and Butane | 6.15 |
| Ethylene | 20.71 |
| Propylene | 14.36 |
| Butenes | 5.46 |
| Gasoline (ibp to 216° C.) | 23.25 |
| BTX component | 14.07 |
| LCO (216° C.-359° C.) | 8.47 |
| HCO (359° C.-fbp) | 2.91 |
| Coke | 0.71 |
| Light Olefins and BTX | 54.60 |

The final yields from the complete operation of the presently disclosed process integrating crude oil reactive distillation in a first stage reactor and then catalytic cracking of the distillate in a second stage reactor were calculated. For this purpose, the yields of chemicals of Table 6 were corrected with the yield of distillate obtained from Example 1, that is 84.2 wt % from Example 1. In addition, the light olefins yield from the first stage reactive distillation, that is 0.07 wt %, 0.21 wt %, and 0.14 wt % of ethene, propene and butenes, respectively, were added back into the total as collected products. Table 7 summarizes the yields of value added petrochemicals for the integrated process as weight percent of the crude oil processed.

The total yield of chemicals increased slightly to 46.3 wt % of the crude oil compared to 44.9 wt % for Example 3. Importantly, the yield of ethylene was doubled while the yield of propylene and butenes decreased. Ethylene to propylene ratio changed from 0.65 in Example 3 to 1.4 in the present example. This demonstrates the flexibility of the process to adjust product slate to the requirements of the chemicals hub in a larger range than can be done, for example, by steam cracking

TABLE 7

| Stream | Yield (wt. % of Crude Oil Feed) |
|---|---|
| Ethylene | 17.5 |
| Propylene | 12.3 |
| Butenes | 4.7 |
| BTX | 11.8 |
| Total Light Olefins and BTX | 46.3 |

It should now be understood the various aspects of the method for processing a crude oil feedstock and associated system are described and such aspects may be utilized in conjunction with various other aspects.

According to a first aspect, a method for processing a crude oil feedstock includes introducing a crude oil stream to a reactive distillation unit to remove conradson carbon and metals from the crude oil stream and generate a distillate stream having a mean boiling point distribution less than the crude oil stream, a light gas stream consisting of C1-C4 hydrocarbons, a heavy liquid fraction comprising atmospheric residue formed from hydrocarbons having a boiling point of 400° C. or greater, and coke; and passing the distillate stream in a gaseous form in a continuous manner and without further processing to a catalytic cracking reactor with a cracking catalyst disposed therein that cracks the distillate stream to form a petrochemical product stream comprising light olefins and BTX, a light gas effluent consisting of hydrogen and C1-C4 alkanes, and an unconverted distillate stream comprising the remainder of the distillate stream passed to the catalytic cracking reactor unit, wherein the catalytic cracking reactor operates at a temperature of 300° C. to 800° C.

A second aspect includes the process of the first aspect in which in which the light gas stream is passed concurrently with the distillate stream to the catalytic cracking reactor.

A third aspect includes the process of the first or second aspect in which light olefins and BTX forming the petrochemical product stream comprise one or more of ethylene, proypelene, butenes, benzene, toluene, and xylenes.

A fourth aspect includes the process of any of the first through third aspects in which the reactive distillation unit is operated at a temperature in the range of 300° C. to 500° C.

A fifth aspect includes the process of any of the first through fourth aspects in which the reactive distillation unit is operated at a pressure in the range of 1 to 20 bars absolute.

A sixth aspect includes the process of any of the first through fifth aspects in which the reactive distillation unit comprises solid particles disposed within the reactive distillation unit.

A seventh aspect includes the process of the sixth aspect in which the solid particles comprise one or more of kaolin, silica, alumina, silica alumina, silica-alumina doped with phosphorus, magnesium oxide, titania, zirconia, alumina-magnesia spinel, hydrotalcite, and molecular sieves.

An eighth aspect includes the process of the sixth or seventh aspect in which the solid particles are removed continuously or periodically from the reactive distillation unit with the heavy liquid fraction.

A ninth aspect includes the process of any of the first through eighth aspects in which the catalytic cracking reactor is a fixed bed reactor.

A tenth aspect includes the process of any of the first through ninth aspects in which the catalytic cracking reactor is operated at pressure in the range of 0.5 to 10 bars absolute.

An eleventh aspect includes the process of any of the first through tenth aspects in which an inert gas is fed to the catalytic cracking reactor.

A twelfth aspect includes the process of the eleventh aspect in which the inert gas is water vapor.

A thirteenth aspect includes the process of any of the first through twelfth aspects in which the cracking catalyst is a zeolite or a mixture of zeolites.

A fourteenth aspect includes the process of the thirteenth aspect in which the cracking catalyst comprises a blend of large pore zeolite and medium pore zeolite.

A fifteenth aspect includes the process of the thirteenth or fourteenth aspects in which the cracking catalyst comprises Y-zeolite and ZSM-5 at a ratio of 90:10 to 50:50 by weight.

A sixteenth aspect includes the process of any of the first through fifteenth aspects in which the catalytic cracking reactor comprises one or more first catalyst beds comprising a large pore zeolite followed by one or more second catalyst beds comprising a medium pore zeolite.

A seventeenth aspect includes the process of the sixteenth aspect in which the first catalyst beds and the second catalyst beds are heated at different temperatures.

An eighteenth aspect includes the process of the seventeenth aspect in which the first catalyst beds are heated at a temperature in the range of 400° C. to 650° C. and the second catalyst beds are heated at a temperature in the range of 500° C. to 750° C.

A nineteenth aspect includes the process of any of the first through eighteenth aspects in which the heavy liquid fraction is recycled back to the reactive distillation unit to extinction.

A twentieth aspect includes the process of any of the first through nineteenth aspects in which the unconverted distillate stream is recycled back to the catalytic cracking reactor for further processing.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

The singular forms "a", "an" and "the" include plural referents, unless the context clearly dictates otherwise.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A method for processing a crude oil feedstock, the method comprising:

introducing a crude oil stream to a reactive distillation unit combining cracking and distillation of the crude oil stream in a single apparatus to remove conradson carbon and metals from the crude oil stream and generate a distillate stream having a mean boiling point distribution less than the crude oil stream, a light gas stream consisting of C1-C4 hydrocarbons, a heavy liquid fraction comprising atmospheric residue formed from hydrocarbons having a boiling point of 400° C. or greater, and coke, wherein a residence time of the crude oil stream in the reactive distillation unit is 1 minute to 60 minutes, where the reactive distillation unit comprises solid particles disposed within the reactive distillation unit to preferentially capture the conradson carbon and metals in the crude oil stream and the coke generated in the reactive distillation unit; and passing the distillate stream in a gaseous form in a continuous manner and without further processing to a catalytic cracking reactor with a cracking catalyst disposed therein that cracks the distillate stream to form a petrochemical product stream comprising light olefins and BTX, a light gas effluent consisting of hydrogen and C1-C4 alkanes, and an unconverted distillate stream comprising the remainder of the distillate stream passed to the catalytic cracking reactor unit, wherein the catalytic cracking reactor operates at a temperature of 300° C. to 800° C.

2. The method of claim 1, where the light gas stream is passed concurrently with the distillate stream to the catalytic cracking reactor.

3. The method of claim 1, where light olefins and BTX forming the petrochemical product stream comprise one or more of ethylene, propylene, butenes, benzene, toluene, and xylenes.

4. The method of claim 1, where the reactive distillation unit is operated at a temperature in the range of 300° C. to 500° C.

5. The method of claim 1, where the reactive distillation unit is operated at a pressure in the range of 1 to 20 bars absolute.

6. The method of claim 1, where the solid particles comprise one or more of kaolin, silica, alumina, silica alumina, silica-alumina doped with phosphorus, magnesium oxide, titania, zirconia, alumina-magnesia spinel, hydrotalcite, and molecular sieves.

7. The method of claim 1, where the solid particles are removed continuously or periodically from the reactive distillation unit with the heavy liquid fraction.

8. The method of claim 1, where the catalytic cracking reactor is a fixed bed reactor.

9. The method of claim 1, where the catalytic cracking reactor is operated at pressure in the range of 0.5 to 10 bars absolute.

10. The method of claim 1, where an inert gas is fed to the catalytic cracking reactor.

11. The method of claim 10, where the inert gas is water vapor.

12. The method of claim 1, where the cracking catalyst is a zeolite or a mixture of zeolites.

13. The method of claim 12, where the cracking catalyst comprises a blend of large pore zeolite and medium pore zeolite.

14. The method of claim 12, where the cracking catalyst comprises Y-zeolite and ZSM-5 at a ratio of 90:10 to 50:50 by weight.

15. The method of claim 1, where the catalytic cracking reactor comprises one or more first catalyst beds comprising a large pore zeolite followed by one or more second catalyst beds comprising a medium pore zeolite.

16. The method of claim 15, where the first catalyst beds and the second catalyst beds are heated at different temperatures.

17. The method of claim 16, where the first catalyst beds are heated at a temperature in the range of 400° C. to 650° C. and the second catalyst beds are heated at a temperature in the range of 500° C. to 750° C.

18. The method of claim 1, where the heavy liquid fraction is recycled back to the reactive distillation unit to extinction.

19. The method of claim 1, where the unconverted distillate stream is recycled back to the catalytic cracking reactor for further processing.

* * * * *